United States Patent [19]

Gilliam

[11] Patent Number: 5,107,698

[45] Date of Patent: Apr. 28, 1992

[54] SMOKE GENERATING APPARATUS AND METHOD FOR IN SITU VACUUM LEAK DETECTION

[76] Inventor: Leslie Gilliam, 10101 Giles Rd., Santa Fe, Tex. 77510

[21] Appl. No.: 681,124

[22] Filed: Apr. 5, 1991

[51] Int. Cl.$^5$ .............................................. G01M 3/20
[52] U.S. Cl. ........................................ 73/40.7; 73/47; 73/49.7
[58] Field of Search ......................... 73/47, 49.7, 40.7

[56] References Cited

U.S. PATENT DOCUMENTS 2,003,949  6/1935  Morgan et al. .................... 73/47 X
3,093,596  6/1963  Cone ........................................ 73/47

FOREIGN PATENT DOCUMENTS

2703730  8/1978  Fed. Rep. of Germany ....... 73/49.7
2545608  11/1984  France .................................... 73/47
199858  7/1923  United Kingdom .................... 73/47

Primary Examiner—Hezron E. Williams
Assistant Examiner—Joseph W. Roskos
Attorney, Agent, or Firm—Harrison & Egbert

[57] ABSTRACT

An apparatus for in situ testing of an internal combustion engine for vacuum leaks is provided. In accordance with the present invention, smoke is generated from a suitable smoke-generating fluid in chamber means, and then sealably communicated through conduit means to the intake manifold of a vacuum system in an internal combustion engine. By visibly observing smoke exiting from any of the hoses, flanges and gaskets contained within a vacuum system, leaks therein may be readily located.

23 Claims, 4 Drawing Sheets

SMOKE GENERATING APPARATUS AND METHOD FOR IN SITU VACUUM LEAK DETECTION

BACKGROUND OF THE INVENTION

This invention relates to leak detection methods and apparatus for diagnostic purposes, and more particularly relates to methods and means for locating leaks in any closed vacuum system in the internal combustion engine.

It is well known in the prior art that an automobile cooling system is intended to be a closed system which enables heat transfer from an operating engine to its water, circulated by a water pump to the radiator which transfers heat from the water to the atmosphere. A leak in the cooling system, typically occurring in a hose, in a clamped connection, or in the walls of the radiator, significantly reduces the cooling efficiency thereof, and may cause overheating of and possible damage to the engine.

It is also well known in the prior art that the internal combustion engine commonly used in automobiles and trucks, contains several vacuum induction systems involving carburetion, fuel injection, power braking, air conditioning, emission control, etc. If a leak occurs in one or more of these closed systems, the operating efficiency of the internal combustion engine is clearly reduced. Indeed, the evasion of air into such vacuum induction systems is a common problem. Vacuum leaks are frequently found even on new cars.

Vacuum leaks in the internal combustion engine, characterized by multiple layers of gaskets, hoses, interconnections, etc., are difficult to find. It frequently necessitates dismantling a particular system and examining individual hoses and their concomitant connections. As an example, in the trucking industry the typical large diameter hoses are disassembled and individually examined for cracks and minute holes with a flashlight or even a light bulb.

Interestingly, many vehicles with computerized control of the internal combustion operation, typically attempt to compensate for such vacuum leaks and the like, instead of diagnosing and suggesting repairs for such leaks. There have been many attempts in the prior art to provide leak detection means and methods for specific portions of a closed system in the internal combustion engine, but there have been few focusing on leak detection for an entire system.

For example, Carney, in U.S. Pat. No. 4,494,402, discloses a device and method for measuring the pressure integrity of a cooling system and the existence of coolant leaks in an automobile. The Carney device attempts to overcome the limitation of the prior art whereby at least two tests must be performed to ascertain the integrity of the entire cooling system, i.e., testing the radiator cap and the remainder of the cooling system separately. More particularly, by configuring a radiator cap to sealably receive a conduit with pressurized air passing therethrough, Carney enables the fluid tightness of the entire cooling system to be simultaneously determined. It is clear to those skilled in the art that the Carney method and means is not applicable to leak detection in vacuum systems.

In U.S. Pat. No. 3,786,671, Caron teaches a vehicle vacuum chamber leak testing device which provides two sleeves having hoses for interconnection with the vacuum intake manifold and another port of entry, of the particular closed system being tested. A spring-diaphragm combination is integrated therewith whereby a leak is indicated when the spring is forced to engage the diaphragm because air has replaced the vacuum.

Similarly, Eason, in U.S. Pat. No. 4,047,423, discloses a leak detector for selectively determining leaks in particular passageways in an automobile engine. In particular, this apparatus provides angular coupling means for engaging opposite ends of the passageway, and then applying air pressure thereto. The behavior thereof under pressure is observed on a pressure gauge mounted on the Eason device. In addition to subjecting such passageway to high pressure, the Eason method can only test a limited portion of a closed system in order to properly locate the source of leaks. U.S. Pat. No. 4,235,100, discloses another version of such a pressure testing device which a cooling system is forced pressurized, and then examined for the existence of pressure drops or fluid leaks.

While, as hereinbefore exemplified, practitioners in the art have attempted to improve the means for detecting significant leaks in the closed systems inherent in the internal combustion engine, there has been less effort expended to detect minor leaks therein. But, with the demands placed upon the performance of such engines necessitating lower compression ratios, using leaner fuel mixtures and to comply with emission control standards of the United States Environmental Protection Agency, even small or minute leaks, particularly vacuum leaks, are apt to be detrimental to the performance thereof.

U.S. Pat. No. 4,667,507, granted to Eriksson, illustrates an attempt to improve the detection art relative to small leakages caused by correspondingly small defects and the like in the cylinder head gasket and the engine block. The Eriksson device provides a means and method for detecting compression leaks during the operation of an internal combustion engine, but fails to detect vacuum leaks therein.

It is well known in the art that smoke may be used to detect the existence of leaks, but smoke detection means have not hitherto been applied to leak detection in internal combustion engines in automobiles and the like. For example, U.S. Pat. Nos. 4,198,856; 4,330,428; 4,694,695; and 3,395,514; illustrate concept of using smoke under pressure to determine leakage. Similarly, U.S. Pat. No. 3,444,721, teaches using a trace gas under pressure to determine leaks along a pipeline. The novel application of such smoke-detection art to test for vacuum leaks in an internal combustion engine, would provide a heretofore unknown technique for quickly, effectively and reliably assessing the integrity of any vacuum system in the automobile engine and the like. Indeed, by providing a cost-effective means and method for properly and regularly testing an engine for vacuum leaks, not only can the longevity and operating efficiency of the engine, per se, be improved, but also the quality of the environment.

Accordingly, these limitations and disadvantages of the prior art are overcome with the present invention, and improved means and techniques are provided which are useful for using smoke for detecting leaks in closed systems in automobile engines and the like.

SUMMARY OF THE INVENTION

The present invention provides an apparatus for testing an internal combustion engine for vacuum leaks. The apparatus includes means for safely generating smoke within chamber means, and then communicating such smoke to the intake manifold of a vacuum system in the internal combustion engine to be tested. By observing smoke exiting from any of the plurality of hoses, flanges, gaskets, etc., in the vacuum system, any and all leaks therein may be located.

In accordance with the present invention, leaks of any and all sizes, regardless of their location in the myriad hoses and joints therefor and throughout the multiple layers contained in modern internal combustion engines, are reliably and, indeed, routinely identified. Thus, an apparatus is provided which enables convenient and inexpensive vacuum leak detection in engines heretofore unknown in the prior art.

As will be described in detail, it is a particular advantage of the present invention that smoke which is sealably communicated to a vacuum system in an internal combustion engine visibly identifies the location of any leaks therein. Even minute crack and the like in hoses, flanges and gaskets will allow the tell-tale smoke to exit therefrom, thereby permitting leaks to be remedied at an early stage. This, of course, prevents damage to the engine, inconvenience to the driver, and pollution of the environment.

As should be appreciated by those skilled in the art, vacuum leaks significantly contribute to inefficiently operating internal combustion engines, and problems therewith. It is accordingly an object of the present invention to provide an apparatus for determining the existence of vacuum leaks in situ in internal combustion engines.

It is also an object of the present invention to provide a method and apparatus for determining leaks in internal combustion engines without requiring any change of or addition to regularly provided factory equipment.

It is a further object of the present invention to provide an apparatus and method for determining the existence of vacuum leaks in automobile engines without applying elevated pressures thereto, thereby avoiding the risk of causing damage thereto.

It is a feature and advantage of the present invention that vacuum leaks may be detected in internal combustion engines with a reliability and concomitant convenience heretofore unknown in the prior art. It is accordingly an object of the present invention to provide means for determining the location of any and all vacuum leaks in an internal combustion engine.

It is also an object and feature of the present invention that an apparatus is provided to enable those skilled in the art to ascertain the presence of leaks in virtually any closed vacuum system in the automobile and the like.

It is a specific object of the present invention to provide, an apparatus for detecting, with a smoke-generating fluid, vacuum leaks in a vehicle with an internal combustion engine having a plurality of vacuum systems, each having an intake manifold, and further having an energizing battery, comprising chamber means for containing said smoke-generating fluid; said chamber means including port means for pouring said smoke-generating fluid and circulation means for circulating said smoke-generating fluid therein; switch means fixedly attached to an internal surface of said chamber means and electrically coupled to said battery, for starting and stopping the operation of said apparatus; heating means fixedly attached to an internal surface of said chamber means and electrically coupled to said switch means and responsive thereto, for vaporizing said smoke-generating fluid into smoke; temperature regulating means fixedly attached to an internal wall of said chamber means and electrically coupled to said heating means, for regulating the operation of said heating means; pressure regulating means fixedly attached to said chamber means for regulating the pressure of said smoke within said chamber means; and conduit means fixedly attached to said chamber means and configured to sealingly communicate said smoke to said intake manifold of one of said plurality of vacuum systems, for visibly detecting said vacuum leaks by the exiting of smoke therefrom into the atmosphere.

It is another specific object of the present invention to provide, an apparatus for detecting, with a smoke-generating fluid, vacuum leaks in a vehicle with an internal combustion engine having a plurality of vacuum systems, each having an intake manifold, and further having an energizing battery, comprising chamber means for containing said smoke-generating fluid; said chamber means comprising port means for pouring said smoke-generating fluid, pump means for circulating said smoke-generating fluid therein, and illumination means for indicating that heating is in progress; fluid flow regulating means fixedly attached to an internal wall of said chamber means, for preventing the inadvertent flow of said smoke-generating fluid through said conduit means; switch means fixedly attached to an internal surface of said chamber means and electrically coupled to said battery, for starting and stopping the operation of said apparatus; spike protection means fixedly attached to an internal wall of said chamber means and electrically coupled to said battery, for preventing voltage surges from damaging said internal combustion engine; said illumination means electrically coupled to said switch means with thermistor means, and activated when a predetermined temperature is reached in said thermistor means; heating means fixedly attached to an internal surface of said chamber means and electrically coupled to said switch means and responsive thereto, for vaporizing said smoke-generating fluid into smoke; said heating means partially immersed in said smoke-generating fluid within said chamber means to enable vaporization thereof into said smoke by said smoke-generating fluid contacting the un-immersed portion of said heating means; temperature regulating means fixedly attached to an internal wall of said chamber means and electrically coupled to said heating means, for regulating the operation of said heating means; pressure regulating means fixedly attached to said chamber means for regulating the pressure of said smoke within said chamber means; and conduit means fixedly attached to said chamber means and configured to sealingly communicate said smoke to said intake manifold of one of said plurality of vacuum systems, for visibly detecting said vacuum leaks by the exiting of smoke therefrom into the atmosphere; with said conduit means including spark-arrestor regulating means, for preventing inadvertent ignition in said internal combustion engine.

These and other objects and features of the present invention will become apparent from the following detailed description, wherein reference is made to the figures in the accompanying drawings.

DETAILED DESCRIPTION

Figure 1:
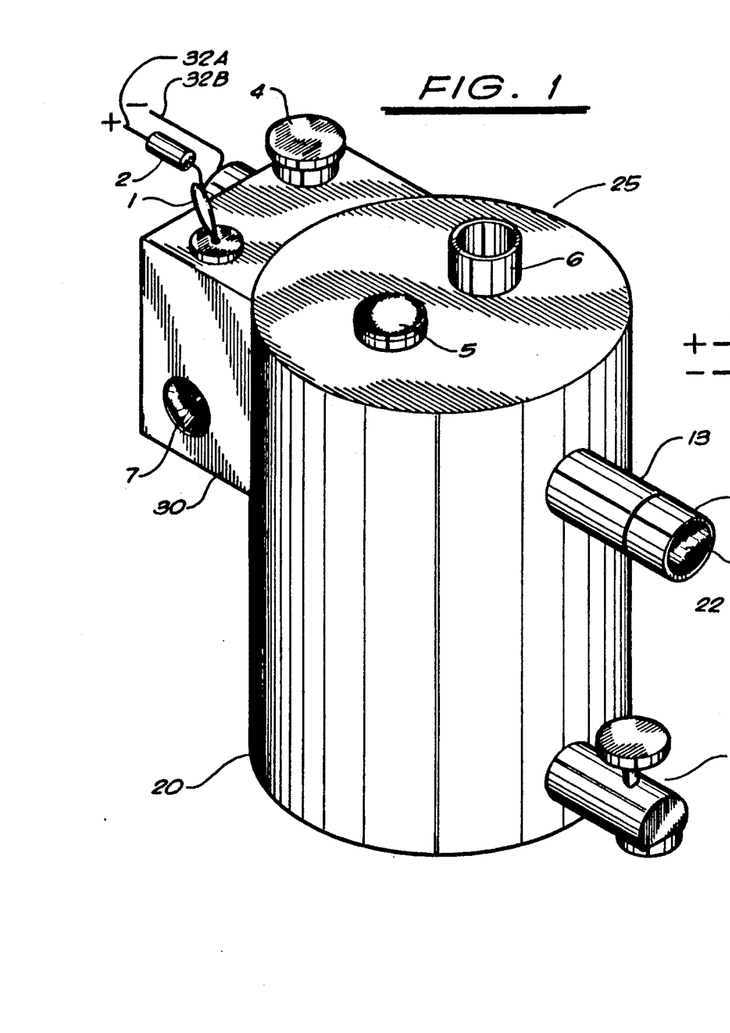
FIG. 1 depicts a frontal perspective view of an apparatus embodying the present invention.

FIG. 1 depicts a frontal perspective view of preferred embodiment of smoke generating apparatus 25 for in situ leak detection in accordance with the present invention. More particularly, there is shown housing 30 fixedly attached to the upper side of chamber 20. In an alternate embodiment, housing 30 and chamber 20 are integrated into a single unit, preferably with a rectangular cross-section. Housing 30 has on-off switch 1 and pressure release dial 4 disposed on the top surface thereof, and air inlet 7 disposed on the front surface thereof. Chamber 20 has indicator light 5 and smoke-generating fluid inlet 6 disposed on the top surface thereof. On the lateral surface of chamber 20, disposed oppositely of housing 30, are conduit 22 and smoke-generating fluid drain 14.

Figure 2:
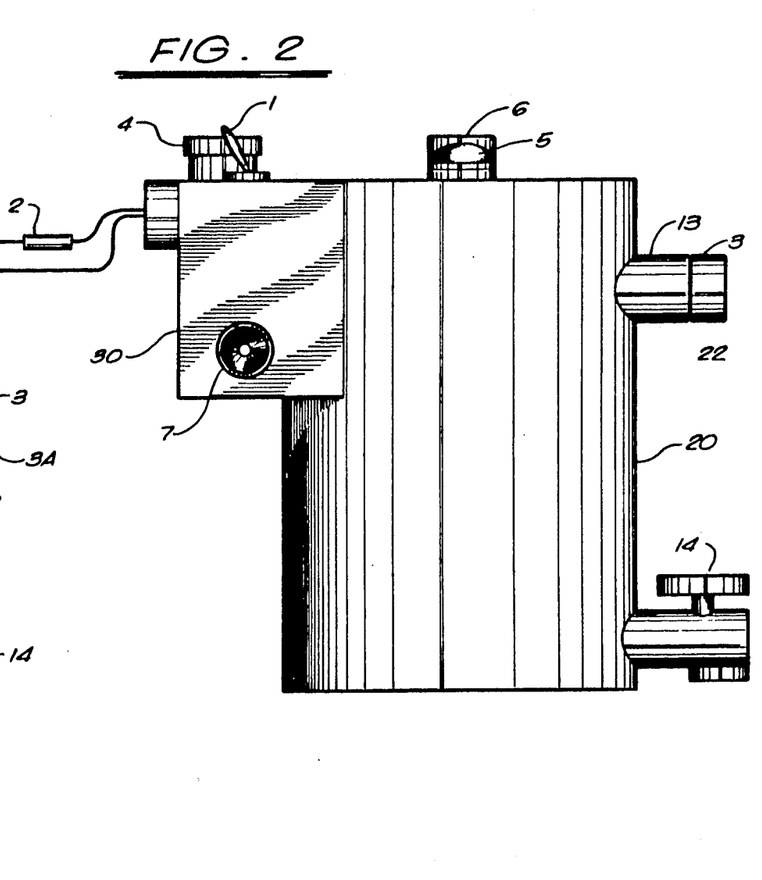
FIG. 2 depicts a front view of the apparatus depicted in FIG. 1.
Figure 3:
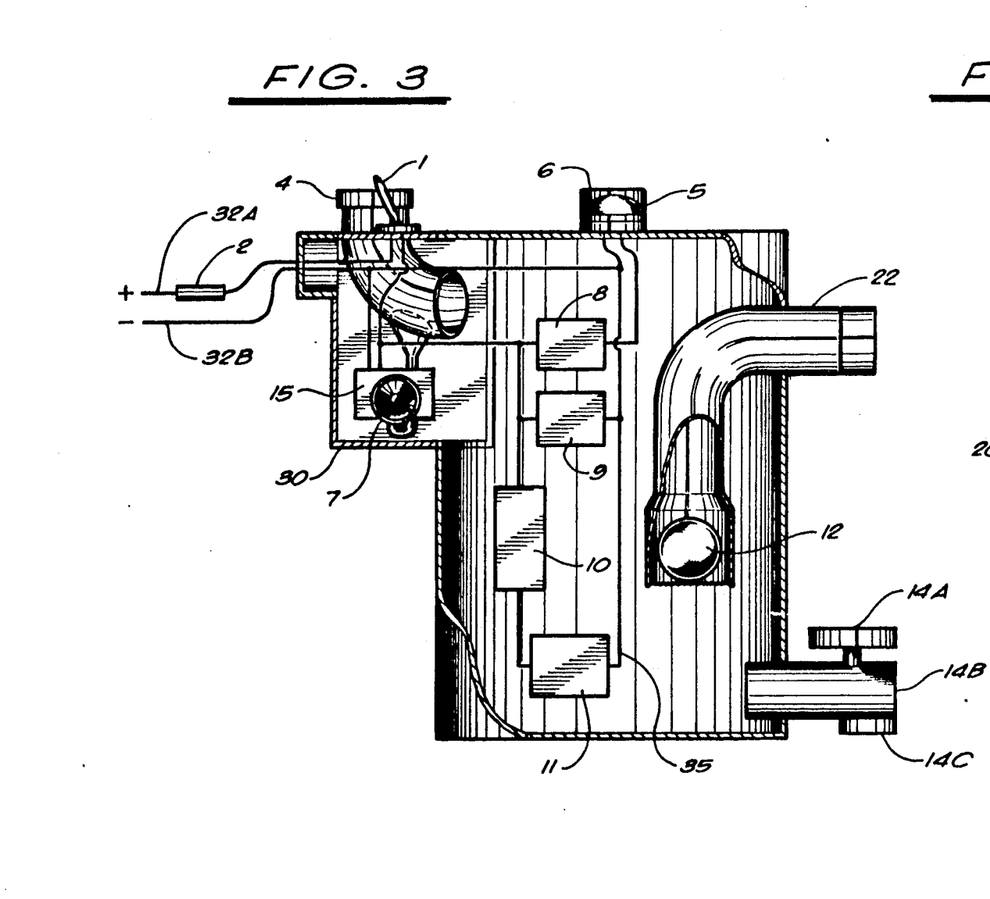
FIG. 3 depicts a front cut-away view of the apparatus depicted in FIG. 2.
Figure 4:
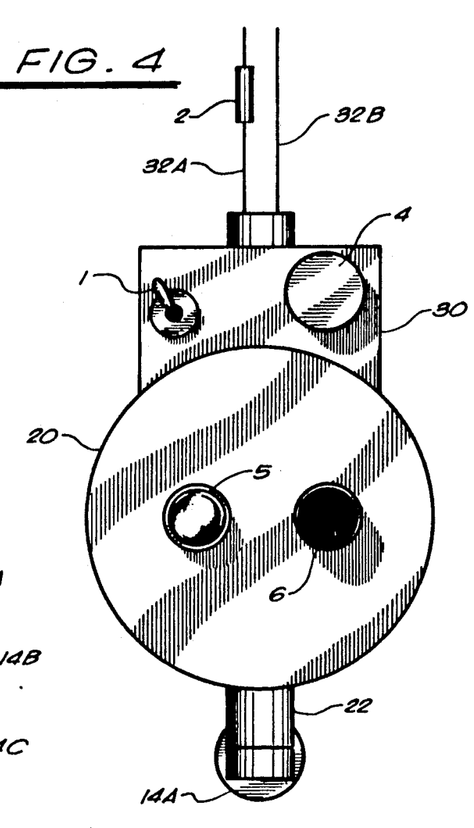
FIG. 4 depicts a top plan view of the apparatus depicted in FIG. 1.

Now referring to FIGS. 1-3, air inlet 7 filters incoming air before it reaches 12-volt bellows pump 15. As should be apparent to those skilled in the art, this prevents dirt and the like from contaminating the pump or otherwise impeding its normal operation. The flow of smoke-generating fluid is controlled by pressure adjustment knob 4 and drain 14. Pressure release knob 4, comprising a conventional ball valve, regulates the pressure manifest by the smoke generated within chamber 20. Thus, depending upon the particular closed system being tested for leaks, all of the pressure generated may not be necessary for testing, or may not be appropriate because of pressure constraints in the system being tested. By suitably rotating knob 4, the cooperating valve is caused to thereby release a proportional amount of pressurized vapor. Of course, knob 4 could be marked or calibrated to indicate specific pressure levels which would be useful for applying prescribed pressures to particular automotive systems.

To confirm that smoke is indeed being generated during the operation of the present invention, attention should preferably be directed to the output stream from conduit 22. In one method of operation, a main hose of the particular automotive system being tested for leaks, should not be connected to conduit 22 until smoke is observed exiting therefrom. In another method of operation, perhaps applicable under circumstances in which leaks appear to be nonexistent, the main hose connected to conduit 22 may be separated therefrom and smoke observed.

The smoke generating aspect of the present invention is known in the prior art, and is generally described by Fortney in U.S. Pat. No. 3,250,723, by Dickman in U.S. Pat. No. 3,432,439, and by Swiatosz in U.S. Pat. No. 4,303,397. In accordance with the present invention, a smoke generating fluid is inserted into chamber 20 through filler port 6. Smoke generating fluid should preferably be non-flammable and non-toxic. For example, Bray Oil Company fireproof hydraulic fluid C-635 with a flash point of 425° F. may be used.

Still referring to FIGS. 1-3, when switch 1 is moved into the "on" position, heating element 11 is activated. As the fluid contained within chamber 20 is heated sufficiently, smoke is generated and exits through conduit 22. Conduit 22 is interconnected at spark-arrestor 3 with the particular automotive closed system to be tested for leaks.

Now referring to FIG. 3, there is shown a cut-away frontal view of the embodiment of the present invention depicted in FIG. 1, in which assembly 35 for the smoke generating aspect is shown in a simplified, schematic view. Cable 32A is electrically connected to a positive terminal preferably of an automobile battery and the like (not shown). Fuse 2 is electrically interconnected with cable 32A, for safety purposes. Similarly, cable 32B is electrically connected to a negative terminal thereof.

Smoke-generating assembly 35 includes pump 15, thermistor 8, spike-protecting diode 9, switch 10, and ceramic heating element 11. A smoke-producing fluid is poured into chamber 20 through filler port 6. In accordance with the preferred embodiment of the present invention, this fluid level should preferably cover approximately one-half of heating element 11. When fluid is being poured into chamber 20 through filler port 6, drain 14 should be in an "open" position. In particular, drain 14 cooperates with the level of smoke-generating fluid such that when fluid starts to exit from drain port 14C, the optimal fluid level, as hereinbefore described, has been obtained. Accordingly, knob 14A is rotated to close a conventional ball valve (not shown), thereby closing drain 14B. Heating element 11 becomes sufficiently hot to cause the smoke-generating fluid to vaporize by coming into contact therewith. If the fluid level substantially exceeds the prescribed level relative to the height of heating element 11, whereby heating element becomes submerged, vaporization is prevented and the fluid is merely heated and eventually reaches its boiling point.

In accordance with the present invention, it is advantageous for housing 20 and chamber 30 to be insulated with a thin piece of slate and the like, and to be constructed from finned aluminum to dissipate heat thereby minimizing the risk of injuring the operator or damaging the automobile. As is well known in the art, the finning promotes this heat transfer because it tends to maximize surface area of the container. It is also advantageous for heating element 11 to be attached abuttably to the bottom of chamber 30. This, of course, minimizes the requisite smoke-generating fluid that must be filled into chamber 30 to reach the preferable ½-way point on heating element 11. In accordance with the preferred embodiment, approximately fluid one inch high is sufficient to generate smoke for leak detecting purposes.

Turning switch 1 to the "on" position illuminates light 5, activates pump 15 whereby the fluid contained in chamber 20 is circulated, and also activates heating element 11. Specifically referring to FIGS. 3 and 7, it is seen that switch 1, air pump 15, indicator light 5, and heating element 11 are included in an electrical circuit contained within chamber 30. The electrical circuit depicted therein further includes heating components thermistor 8, spike-protector 9, bimetallic strip 10, and, of course, heating element 11. In a preferred embodiment of the present invention, heating element 11 consists of a conventional 3-ohm ceramic resistor heater.

In conjunction with the use of the hereinbefore described smoke-generating fluid, thermistor 8 is preferably preset to about 220° F. and senses the temperature in chamber 30. Part number TS6642 manufactured by Echlin Inc. of Bradford, Conn., is a representative thermistor which may be incorporated into the preferred embodiment. Referring again to FIGS. 3 and 7, when the chamber temperature reaches 220° F., thermistor 8 "closes" and enables current to flow to indicator light 5. This, of course, provides a visual indication that the smoke-generating fluid is being heated in accordance with the methodology taught by the present invention.

Figure 7:
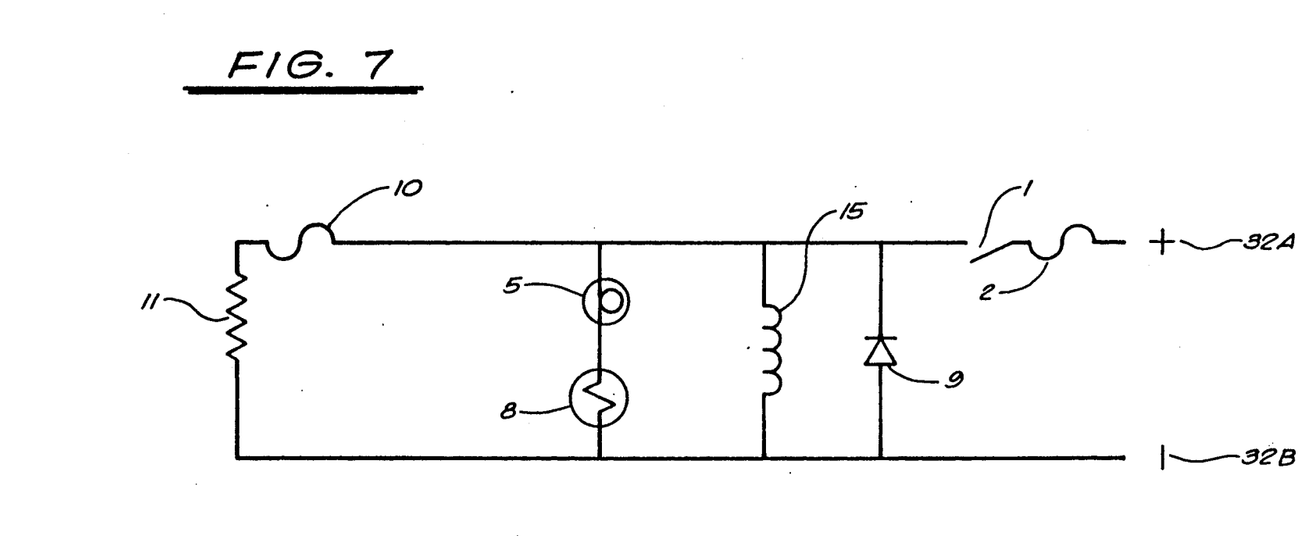
FIG. 7 depicts a simplified schematic diagram of the electrical circuit embodying the present invention.

In accordance with the preferred embodiment of the present invention, bimetallic strip 10 interrupts the heating action of heating element 11 preferably when the temperature in chamber 30 reaches approximately 250° F. Bimetallic strip 10 preferably maintains the temperature of the smoke-generating fluid in the temperature range 240° to 250° F. As should be clear to those skilled in the art, the preset temperature for thermistor 8 and the preferable temperature range within chamber 30, which is regulated by bimetallic strip 10, is a function of the physical properties of the particular smoke-generating fluid selected.

In accordance with the preferred embodiment, spike-protecting diode 9 prevents transient voltage from insulting a vehicle's electrical system. An illustrative spike-protector diode which may be incorporated into the preferred embodiment is General Electric part number IN4001 corresponding to a 1 amp diode rated with peak inverse voltage of 100. As is well known to those skilled in the art, since transient voltages may be generated in an internal combustion engine, there is tendency to cause corresponding electrical voltage surges therein. Accordingly, the spike-protector diode conveniently "opens" the positive side of the electrical circuit, thereby enabling the transient to feed back through its negative side to ground.

As should be apparent to those skilled in the art, the hereinbefore described electrical devices are secured to the walls, or the like, of housing 20 or chamber 30 by fixedly attaching them thereto in a convenient position. The wiring within housing 20 or chamber 30 is grounded through negative wire and not to the metal housing or chamber. This is to prevent the instant apparatus from being disabled if positive wire lost its insulation or if internal wiring lost insulation, and then contacted the metal walls.

Figures 5, 6:
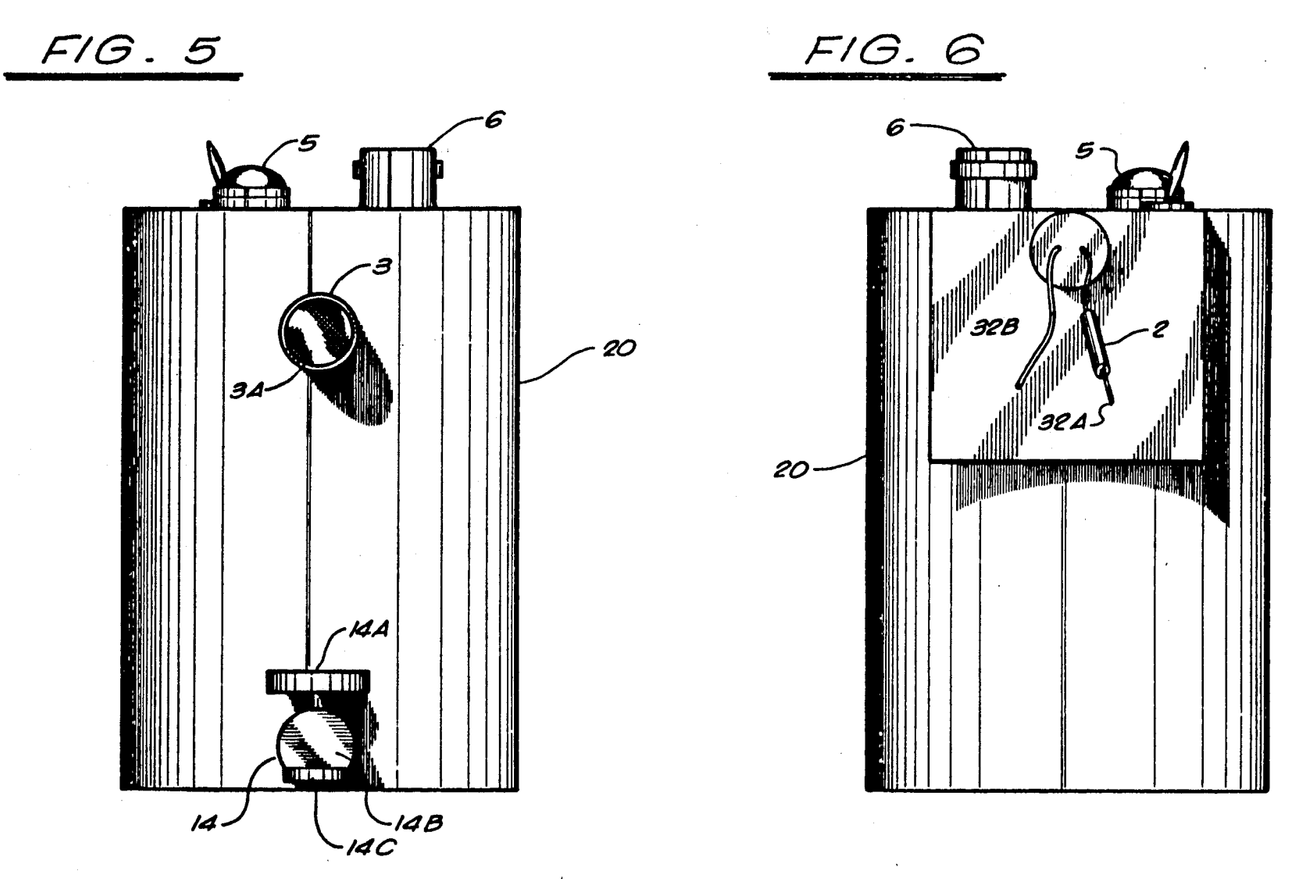
FIG. 5 depicts a right side view of the apparatus depicted in FIG. 1.
FIG. 6 depicts a left side view of the apparatus depicted in FIG. 1.

Another protection against invasion of a vehicle's closed system is spark-arrestor 3 which is disposed at the remote end of conduit 22 as an interface with the vehicle's engine. A typical spark-arrestor is part number 2994 of Echlin Inc. of Bradford, Conn. As should be clear to those skilled in the art, spark-arrestor 3 prevents sparks or even flames from entering a vehicle's engine, thereby causing an explosion. Flames could be generated, for example, if a flammable fluid mixture was inadvertently created in chamber 20. Referring now to FIGS. 1 and 5, there is seen filter 3A disposed orthogonally at the end of spark-arrestor 3, and screwably attached thereto, to prevent contaminants, impurities, coagulants, etc., from entering the internal combustion engine therethrough.

Referring now to FIG. 3, there is depicted check ball valve 12 which prevents fluid from exiting the vehicle's system through a vacuum hook-up hose, if chamber 30 is inadvertently inverted or even overfilled. As should be apparent to those skilled in the art, a hydrostatic lock and the like is prevented by a plastic ball being forced against a tapered tube within the lower portion of conduit 22. The specific gravity of the plastic ball, which preferably can withstand temperatures as high as 300° F., is selected to be greater than the specific gravity of the smoke-generating fluid residing within chamber 30. Accordingly, during normal operation of the present invention, ball valve 12 rests upon the surface of the smoke-generating fluid and is disposed in an "open" position, thereby permitting the generated smoke to pass through conduit 22 into the vacuum system connected thereto for leak testing purposes. Otherwise, ball valve 12 safeguards the integrity of the engine from any kind of inadvertent error in orientating an embodiment of the present invention with respect to the engine being tested for leaks.

Thus, in accordance with the present invention, to test a particular automotive system for leaks, preferably a vacuum source hose therefor, e.g., intake manifold hose, should be interconnected with conduit 22 at spark-arrestor 3. No subordinate hoses and the like within the system need to be disconnected. Under the concept of the present invention, any and all vacuum leaks therein will be readily ascertained by the presence of smoke emanating therefrom. Regardless of the size of the leak in a hose or in a concomitant connection, and regardless of the number of hoses and interconnections in a particular system, the method and apparatus of the present invention will conveniently and reliably locate the presence of leaks therein.

As is known to those skilled in the art, most automotive engine misfires are attributable to vacuum leaks therein. It is also well known that engines operating with lean fuel mixtures tend to misfire when an interruption to its equilibrium, e.g., vacuum leaks, occurs. In view of the emissions control standards adopted by the United States Environmental Protection Agency's tending toward leaner fuel mixtures, the present invention will enable the anticipated plethora of engine misfires to be expeditiously quelled by its unique smoke-detection means and method.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the concept of the present invention is to measured by the scope of the appended claims herein.

What is claimed is:

1. An apparatus for detecting, with a smoke-generating fluid, vacuum leaks in a vehicle with an internal combustion engine having a plurality of vacuum systems, each having an intake manifold, and further having an energizing battery, comprising:

chamber means for containing said smoke-generating fluid;

said chamber means including port means for pouring said smoke-generating fluid and circulation means for circulating said smoke-generating fluid therein;

switch means fixedly attached to an internal surface of said chamber means and electrically coupled to said battery, for starting and stopping the operation of said apparatus;

heating means fixedly attached to an internal surface of said chamber means and electrically coupled to said switch means and responsive thereto, for vaporizing said smoke-generating fluid into smoke;

temperature regulating means fixedly attached to an internal wall of said chamber means and electrically coupled to said heating means, for regulating the operation of said heating means;

pressure regulating means fixedly attached to said chamber means for regulating the pressure of said smoke within said chamber means; and conduit means fixedly attached to said chamber means and configured to sealingly communicate said smoke to said intake manifold of one of said plurality of vacuum systems, for visibly detecting said vacuum leaks by the exiting of smoke therefrom into the atmosphere.

2. The apparatus recited in claim 1, wherein said chamber means comprises fluid flow regulating means fixedly attached to an internal wall of said chamber means, for preventing the inadvertent flow of said smoke-generating fluid through said conduit means.

3. The apparatus recited in claim 2, wherein said fluid flow regulating means comprises first valve means fixedly inserted into said conduit means, disposed transversely thereof.

4. The apparatus recited in claim 1, wherein said chamber means is constructed with a finned material to enable heat generated therein to be rapidly dissipated therefrom.

5. The apparatus recited in claim 1, wherein said chamber means includes insulating means abuttably disposed therebeneath for preventing heat related damage to the operator or to the surface of said vehicle.

6. The apparatus recited in claim 1, wherein said conduit means comprises spark-arrestor regulating means, for preventing inadvertent ignition in said internal combustion engine.

7. The apparatus recited in claim 1, wherein said heating means comprises resistor heater means.

8. The apparatus recited in claim 1, wherein said heating means is abuttably disposed on the bottom of said chamber means.

9. The apparatus recited in claim 1, wherein said heating means is partially immersed in said smoke-generating fluid within said chamber means to enable vaporization thereof into said smoke by said smoke-generating fluid contacting the un-immersed portion of said heating means.

10. The apparatus recited in claim 1, wherein said circulating means comprises air pump means.

11. The apparatus recited in claim 10, wherein said pumping means further comprises filter means to prevent dirt and dust from being ingested thereinto.

12. The apparatus recited in claim 1, wherein said pressure regulating means comprises second valve means for venting excess smoke from said chamber means into the ambient air.

13. The apparatus recited in claim 1, wherein said pressure regulating means comprises discharge means for removing excess smoke-generating fluid from said chamber means.

14. The apparatus recited in claim 1, wherein said temperature regulating means comprises bimetallic strip means for maintaining the temperature of said smoke within a prescribed range.

15. The apparatus recited in claim 1, wherein said chamber means includes illumination means, for indicating that heating is in progress, electrically coupled to said switch means with thermistor means, and activated when a predetermined temperature is reached in said thermistor means.

16. The apparatus recited in claim 1, wherein said chamber means includes spike protection means for preventing voltage surges from damaging said internal combustion engine.

17. An apparatus for detecting, with a smoke-generating fluid, vacuum leaks in a vehicle with an internal combustion engine having a plurality of vacuum systems, each having an intake manifold, and further having an energizing battery, comprising:

chamber means for containing said smoke-generating fluid;

said chamber means comprising port means for pouring said smoke-generating fluid, pump means for circulating said smoke-generating fluid therein, and illumination means for indicating that heating is in progress;

fluid flow regulating means fixedly attached to an internal wall of said chamber means, for preventing the inadvertent flow of said smoke-generating fluid through said conduit means;

switch means fixedly attached to an internal surface of said chamber means and electrically coupled to said battery, for starting and stopping the operation of said apparatus;

spike protection means fixedly attached to an internal wall of said chamber means and electrically coupled to said battery, for preventing voltage surges from damaging said internal combustion engine;

said illumination means electrically coupled to said switch means with thermistor means, and activated when a predetermined temperature is reached in said thermistor means;

heating means fixedly attached to an internal surface of said chamber means and electrically coupled to said switch means and responsive thereto, for vaporizing said smoke-generating fluid into smoke;

said heating means partially immersed in said smoke-generating fluid within said chamber means to enable vaporization thereof into said smoke by said smoke-generating fluid contacting the un-immersed portion of said heating means;

temperature regulating means fixedly attached to an internal wall of said chamber means and electrically coupled to said heating means, for regulating the operation of said heating means;

pressure regulating means fixedly attached to said chamber means for regulating the pressure of said smoke within said chamber means; and conduit means fixedly attached to said chamber means and configured to sealingly communicate said smoke to said intake manifold of one of said plurality of vacuum systems, for visibly detecting said vacuum leaks by the exiting of smoke therefrom into the atmosphere; with said conduit means including spark-arrestor regulating means, for preventing inadvertent ignition in said internal combustion engine.

18. The apparatus recited in claim 17, wherein said fluid flow regulating means comprises first valve means fixedly inserted into said conduit means, disposed transversely thereof.

19. The apparatus recited in claim 17, wherein said chamber means is constructed with a finned material to enable heat generated therein to be rapidly dissipated therefrom.

20. The apparatus recited in claim 17, wherein said heating means comprises resistor heater means.

21. The apparatus recited in claim 17, wherein said pressure regulating means comprises second valve means for venting excess smoke from said chamber means into the ambient air.

22. The apparatus recited in claim 17, wherein said pressure regulating means comprises discharge means for removing excess smoke-generating fluid from said chamber means.

23. The apparatus recited in claim 17, wherein said temperature regulating means comprises bimetallic strip means for maintaining the temperature of said smoke within a prescribed range.

* * * * *